Patented Apr. 4, 1939

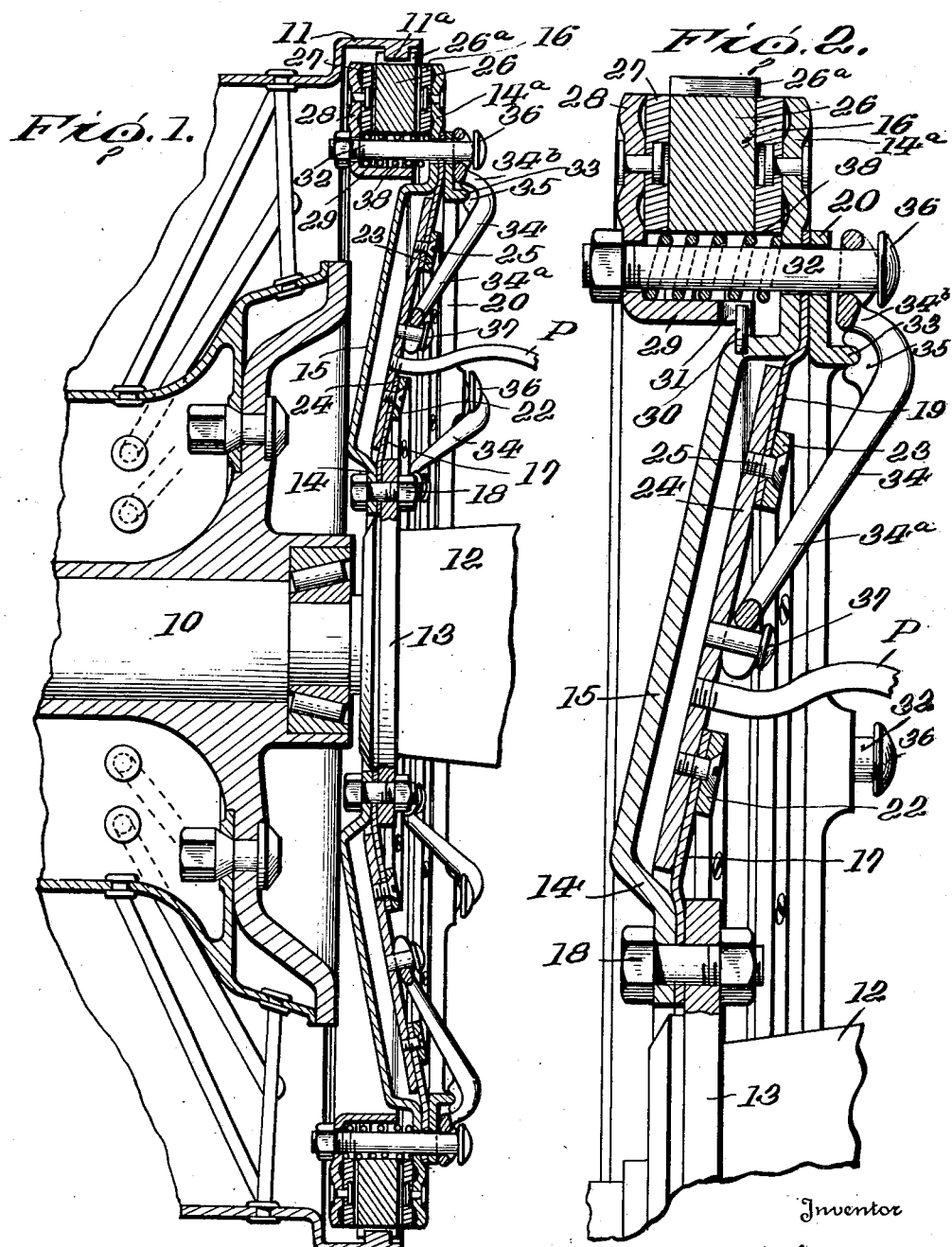

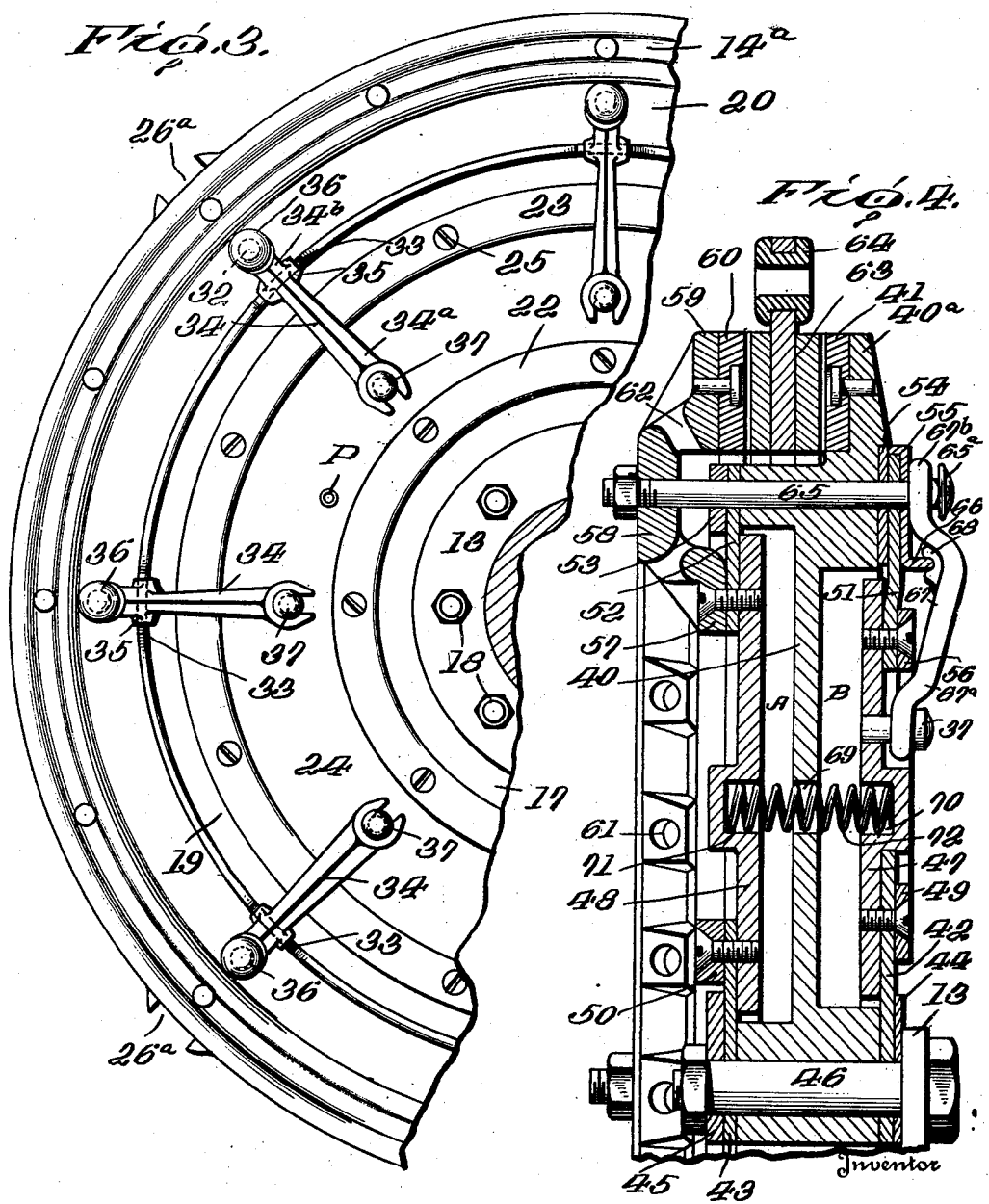

2,152,669

UNITED STATES PATENT OFFICE 2,152,669

FLUID PRESSURE CONTROLLED BRAKE DEVICE

Frederick L. Shelor, Jr., Sandston, Va., assignor to Innovation Brakes, Inc., Richmond, Va., a corporation of Virginia Application May 4, 1936, Serial No. 77,840

9 Claims. (Cl. 188—72)

The present invention relates to new and useful improvements in a braking device for rotating parts and more particularly to a fluid pressure controlled braking device which includes a plurality of discs movable relative to one another for applying the braking pressure.

An object of the invention is to provide a braking device of the above type wherein a lever mechanism is utilized for increasing the braking force normally exerted by the relative movement of the discs.

A further object of the invention is to provide a braking device of the above type wherein the lever mechanism permits a greater relative movement of the discs for a corresponding movement of the brake shoes whereby a gradual application of the braking pressure may be effected.

A further object of the invention is to provide a braking device of the above type wherein the lever mechanism is disposed between a movable disc and the braking means for increasing the braking pressure exerted on the said braking means.

The above and other objects of the invention will in part be obvious and will be hereinafter more fully described.

In the drawings:

Fig. 1 is a vertical section through the rotatable member showing the braking mechanism applied thereto.

Fig. 2 is an enlarged sectional view through a portion of the wheel showing the braking means in engagement for stopping the rotatable member.

Fig. 3 is a fragmentary end elevation showing the arrangement of the lever mechanism.

Fig. 4 is an enlarged vertical section showing a modified form of braking mechanism.

The invention is shown as applied to a vehicle wheel but it is to be clearly understood that it is to be used in connection with any rotating member. Attached to the rotating member is a drum within which a stationary disc is rigidly fixed to the axle housing. A second disc is also mounted within the drum and is secured to the axle housing and to the stationary disc by flexible connections which prevent its rotation, but which permit a limited axial movement thereof toward and away from the cooperating stationary disc. The two discs and the flexible connections therebetween form a chamber which may be placed under vacuum for causing the movable disc to shift toward the stationary disc. One of the brake shoes is carried by the outer edge of the stationary disc and the cooperating brake shoe is connected to the movable disc by a lever mechanism. The cooperating brake shoe is keyed to the stationary disc so that it is non-rotating but is permitted to shift toward and away from the brake shoe on the stationary disc. The rotating drum carries a braking surface which is disposed between the cooperating brake shoes. When the chamber between the two discs is placed under vacuum, the shifting of the movable disc toward the stationary disc operates through the lever mechanism to shift the movable brake shoe toward the stationary brake shoe and thus cause contact between the two brakes shoes and the braking surface carried by the drum. The lever mechanism operates to increase the braking force incident to the shifting of the movable disc toward the stationary disc. Spring means are provided for separating the brake shoes and the discs when the vacuum on the chamber between the two discs is released.

Referring more in detail to the accompanying drawings, the invention is shown as applied to a vehicle wheel which is mounted on suitable bearings carried by a spindle 10. Secured to the wheel is a drum 11 which is rotatable therewith. The axle housing 12 is provided with an annular shoulder 13. An annular disc 14 has the inner edge thereof secured to the shoulder 13 by screws 18 or the like. The disc 14 is provided with an annular recessed portion 15 and with an annular edge portion 14a. The edge portion 14a carries a brake shoe 16. The disc 14, being secured to the axle housing 12, is thus stationary and non-rotating. The inner edge of an annular flexible member 17 is clamped between the inner edge of the disc 14 and the shoulder 13 on the axle housing by the bolts 18. The outer edge of a similar annular flexible member 19 is secured between the outer face of the edge 14a of the disc 14 and an annular ring or clamping member 20. The free edges of both of these flexible members 17 and 19 are secured between clamping plates or rings 22, 23 respectively and a movable annular disc 24 by screws 25 or the like. The disc 24 is of a width substantially equal to the width of the recessed portion 15 in the stationary disc 14 so that a minimum amount of space is taken up by the discs within the drum 11. The disc 24, thus secured to the stationary disc 14, is also non-rotating but a shifting movement thereof is permitted toward and away from the stationary disc 14 by means of the flexible connecting members 17 and 19. The flexible members 17 and 19, in addition to connecting the movable disc 24, form a seal around the edges of the two discs so that there is provided therebetween a chamber which may be placed under vacuum. A flexible pipe P is connected to the movable disc 24 and communicates with the chamber between the two discs and a vacuum creating device so that the said chamber may be vacuumized.

A braking member 26 is connected to the drum 11 in a manner which causes said braking member to rotate with the drum but which permits it to be shifted axially of the drum when a braking force is applied. For this purpose, the drum 11 is embodied with spaced lugs 11a which extend into transverse recesses 26a in the braking member. A brake shoe 27 is secured to an annular member 28 which is provided with an inwardly turned axially directed edge portion 29. The edge of the portion 29 extends to a point adjacent the outer edge of the recessed portion 15 in the stationary disc 14. A plurality of spaced pins 30 extend outwardly from the recessed portion 15 in the stationary disc 14 into similarly spaced slots 31 at the edge of the inturned portion 29, thus preventing rotation of the annular member 28 but permitting the shifting thereof toward and away from the cooperating brake shoe 16. The annular member 28 is mounted on spaced pins 32 which extend therethrough and also through the annular edge portion 14a of the disc 14 and the clamping plate 20. The clamping plate 20 is provided at the inner edge thereof with spaced outwardly projecting ribs 33, each of which acts as a fulcrum for levers 34.

Each lever 34 is provided intermediate the ends thereof with a rib portion 35 which is recessed to fit over and bear on a corresponding rib 33 on the plate 20. The ribs 35 on the levers 34 are disposed so that there is a long arm 34a and a short arm 34b on opposite sides of the fulcrum. The shorter arm 34b of each of the levers 34 is provided with an apertured end through which a pin 32 extends. Each of the pins 32 is provided with a head 36 beneath which the short end of the lever 34 is disposed. The longer arm of each of the levers 34 is provided with a forked end which is disposed beneath headed studs 37 which are carried by the movable disc 24. A spring 38 surrounds the pin 32 between the annular shoe carrying member 28 and the inner face of the annular edge portion 14a of the stationary disc 14 and thus serves to separate the brake shoes and the discs when the vacuum is released.

In operation, when a vacuum is drawn on a chamber between the two discs 14 and 24, the movable disc 24 will shift toward the stationary disc 14 into the recessed portion 15 thereof. This movement of the disc 24 will cause the levers 34 to rock about their fulcrums 33. This rocking of the levers 34 will operate through the pins 32 to draw the annular shoe carrying member 28, against the action of the spring 38, toward the annular edge 14a of the stationary disc 14. Thus the brake shoe 27 carried by the annular member 28 will engage the braking surface 26 and cause it to shift axially of the drum 11 into engagement with the cooperating brake shoe 16, thus clamping the braking surface 26 between the two brake shoes. The position of the parts when the braking surface is clamped between the two brake shoes is shown in Fig. 2. When the vacuum on the chamber between the two discs 14 and 24 is released, the spring 38 will separate the brake shoes and also, through the lever mechanism, will urge the movable disc 24 away from the stationary disc 14.

In the modified form of the invention shown in Fig. 4, two movable discs are employed, one on each side of the stationary disc. The stationary disc 40 is secured to the shoulder 13 on the axle housing and is provided with an annular edge portion 40a which carries a brake shoe 41. The body portion of the disc 40 between the axle housing and the annular edge portion 40a is shaped so as to provide annular recesses A and B on each side thereof. Flexible diaphragms 42, 43 are secured to opposite faces of the inner edge of the disc 40. The inner edges of the diaphragms 42 and 43 are clamped between annular clamping plates 44, 45 respectively which are secured by the bolts 46 passing through the shoulder on the axle housing. The outer or free edges of the diaphragms 42 and 43 are secured to movable annular discs 47, 48 respectively by annular clamping plates 49, 50 respectively. Secured to opposite faces of the disc 40 at the outer edge of the recesses A and B therein, are additional flexible diaphragms 51, 52. The outer edge of the diaphragm 52 is clamped between the disc 40 and a clamping plate 53. The outer edge of the diaphragm 51 is clamped to the discs 40 between an insulating member 54 and an annular clamping plate 55. The inner edge of the diaphragm 51 is secured to the movable disc 47 by a clamping plate 56. The inner edge of the diaphragm 52 is secured between the outer edge of the disc 48 and a clamping face 57 on an annular member 58.

The annular member 58 is provided with an annular extension 59 which carries a brake shoe 60. The portions 57 and 59 of the annular member 58 are offset with respect to the body portion thereof and a plurality of ports 61, 62 is provided for permitting circulation of air to afford a cooling effect on the braking device. The braking member or surface 63 is disposed between the shoes 41 and 60 and is provided with spaced eyelets 64 which are carried by similarly spaced pins on the drum (not shown). Thus the braking surface 63 is movable with the drum and is permitted to shift axially thereof as the brake shoes are brought into clamping contact therewith.

A plurality of spaced pins 65 extends through the annular member 58, the disc 40 and the clamping plate 55. As described in connection with Figs. 1 and 2, the clamping plate 55 is provided with spaced projecting ribs 66 which serve as fulcrums for the levers 67. Each of the levers 67 is provided with a rib 68 which is recessed so as to fit over and bear on a corresponding rib 66. The longer arm 67a of each of the levers 67 is connected to a headed stud 37 on the disc 47. The shorter arm 67b of each of the levers is connected to the pin 65 beneath the head 65a thereon. The disc 40 is provided with spaced openings 69 therethrough and the movable discs 47, 48 are provided with similarly spaced recesses 70, 71 respectively. Disposed between the movable discs is a plurality of springs 72 which pass through the openings 69 in the disc 40 and bear against the surfaces of the recesses 70 and 71 in the movable discs. The flexible diaphragms connecting the movable discs to the stationary disc 40 form a seal therearound so that the recesses A and B may be placed under vacuum.

In operation, when the chambers or recesses between the disc 40 and the movable discs 47 and 48 are placed under vacuum, both movable discs will be caused to shift toward the stationary disc 40 against the action of the spring 72. Since the annular member 58 is secured to the movable disc 48, the inward movement thereof will cause a similar movement of the annular member 58. Thus the brake shoe 60 which is carried by the annular edge portion 59 of the member 58 will be shifted toward and into contact with the braking surface 63. Inward movement of the disc 47 will operate through the levers 67 in the manner heretofore described, to also move the annular member 58 inwardly with the disc 48. In this form of the invention, there is, therefore, a compound effort exerted on the movable brake shoe 60. There is a direct connection between the brake shoe 60 and the movable disc 48 and a lever connection between the brake shoe 60 and the movable disc 47. The springs 72 serve to separate the movable discs and thus separate the brake shoes when the vacuum on the chambers A and B is released.

From the foregoing description, it will be seen that the present invention affords a highly efficient braking mechanism wherein the forces operating on the movable disc to apply the braking pressure are multiplied in their effective action on the movable brake shoe. This increased braking force is effected by the lever mechanism which connects the movable brake shoe with the movable disc. It is to be further noted that, with the present arrangement of lever mechanism, that is, with the longer arms of the levers connected to the movable disc, a given movement of the movable disc imparts a lesser corresponding movement to the shiftable brake shoe. In this manner, the force of the vacuum created between the two discs is multiplied in its effective action on the shiftable brake shoe and, furthermore, a more gradual application of braking pressure is made possible.

It is to be clearly understood that minor changes in the details of construction and arrangement of parts may be made without departing from the scope of the invention as set forth in the appended claims.

I claim:

1. In a braking mechanism the combination of a rotatable member, a braking member connected to said rotatable member for rotation therewith, a plurality of non-rotating discs, brake shoes associated with said discs and disposed on opposite sides of said braking member, flexible means connecting said discs and forming therebetween a chamber adapted to be placed under vacuum and permitting relative axial movement of said discs, a plurality of radially disposed levers spaced from each other, means for connecting the outer ends of said levers to one of said brake shoes and means for connecting the inner ends of said levers to one of said discs whereby axial movement of said discs will operate through said levers for causing the brake shoe to engage the braking member.

2. In a braking mechanism the combination of a rotatable member, a braking member connected to said rotatable member for rotation therewith, a stationary disc, a brake shoe carried thereby and disposed at one side of said braking member, a non-rotating shiftable disc associated with said stationary disc, a brake shoe connected to said shiftable disc and disposed on the opposite side of said braking member, flexible means connecting said shiftable disc with said stationary disc and forming therebetween a chamber adapted to be placed under vacuum, a plurality of radially disposed levers spaced from each other, means for connecting the outer ends of said levers to one of said brake shoes and means for connecting the inner ends of said levers to one of said discs whereby axial movement of said discs will operate through said levers for causing the brake shoe to engage the braking member.

3. In a braking mechanism the combination of a rotatable member, a braking member connected to said rotatable member for rotation therewith, a non-rotating disc, a brake shoe carried thereby and disposed at one side of said braking member, an annular member associated with said disc, a brake shoe carried by said annular member adapted to engage the other side of said braking member, a movable disc associated with said non-rotating disc, flexible means connecting said movable disc with said non-rotating disc and forming a chamber therebetween adapted to be placed under vacuum, and a plurality of levers radially spaced from each other, said levers at their outer ends being connected to one of said brake shoes and at their inner ends to one of said disks, whereby axial movement of the disks will operate through said levers for causing said brake shoes to engage said braking member.

4. In a braking mechanism the combination of a rotatable member, a braking member connected to said rotatable member for rotation therewith, a stationary disc, a brake shoe carried thereby and disposed at one side of said braking member, a non-rotating disc shiftable toward and away from said stationary disc, flexible means connecting said shiftable disc with said stationary disc and forming therebetween a chamber adapted to be placed under vacuum, a plurality of pins extending through said stationary disk, a brake shoe carried by said pins and disposed on the opposite side of said braking member, a plurality of levers associated with said pins, each lever being connected to one of said pins and having the opposite end thereof connected to said shiftable disk and operating upon movement of said shiftable disk when the chamber is placed under vacuum to multiply the effective force acting on the brake shoe carried by said pin.

5. In a braking mechanism the combination of a rotatable member, a braking member connected to said rotatable member for rotation therewith, a stationary disc, a brake shoe carried thereby and disposed at one side of said braking member, a non-rotating disc shiftable toward and away from said stationary disc, flexible means connecting said shiftable disc with said stationary disc and forming therebetween a chamber adapted to be placed under vacuum, a plurality of pins extending through said stationary disk, a brake shoe carried by said pins and disposed on the opposite side of said braking member, a plurality of levers associated with said pins, each lever being connected to one of said pins and having the opposite end thereof connected to said shiftable disk and operating upon movement of said shiftable disk when the chamber is placed under vacuum to multiply the effective force acting on the brake shoe carried by said pin.

6. In a braking mechanism the combination of a rotatable member, a braking member connected to said rotatable member for rotation therewith, a stationary disc, a brake shoe carried thereby and disposed at one side of said braking member, a non-rotating disc shiftable toward and away from said stationary disc, flexible means connecting said shiftable disc with said stationary disc and forming therebetween a chamber adapted to be placed under vacuum, a plurality of pins extending through said stationary disk, a brake shoe carried by said pins and disposed on the opposite side of said braking member, a plurality of levers associated with said pins, each lever being connected to one of said pins and having the opposite end thereof connected to said shiftable disk and operating upon movement of said shiftable disk when the chamber is placed under vacuum to multiply the effective force acting on the brake shoe carried by said pin, and spring means disposed between said stationary disk and said annular member for separating the brake shoes and the disks when the vacuum on the chamber is released.

7. In a braking mechanism the combination of a rotatable member, a braking member connected to said rotatable member for rotation therewith, a stationary disc, a brake shoe carried thereby and disposed at one side of said braking member, a non-rotating disc shiftable toward and away from said stationary disc, flexible means connecting said shiftable disc with said stationary disc and forming therebetween a chamber adapted to be placed under vacuum, a shiftable brake shoe disposed on the opposite side of said braking member, and a plurality of levers each having one end thereof connected to said shiftable brake shoe and the other end thereof connected to said shiftable disk, the fulcrum for each of said levers being disposed nearer the connection with said shiftable brake shoe whereby the effective force acting on the shiftable brake shoe by the movement of the shiftable disk will be multiplied.

8. In a braking mechanism the combination of a rotatable member, a braking member connected to said rotatable member for rotation therewith, a stationary disc having an annular recessed portion, a brake shoe carried by the outer edge of said disc and disposed at one side of said braking member, a non-rotating annular disc substantially coextensive with the recess in said stationary disc and shiftable toward and away from the same, flexible means connecting said shiftable disc with said stationary disc and forming therebetween a chamber adapted to be placed under vacuum, a brake shoe connected to said shiftable disc and disposed on the opposite side of said braking member, and a lever mechanism including a plurality of levers interposed between said shiftable disc and the brake shoe connected therewith and operating upon the movement of said shiftable disc when the chamber is placed under vacuum to multiply the effective force acting on the connected brake shoe.

9. In a braking mechanism the combination of a rotatable member, a braking member connected to said rotatable member for rotation therewith, a non-rotating disc, a brake shoe carried thereby and disposed at one side of said braking member, a pair of non-rotating discs disposed one on each side of said stationary disc and shiftable toward and away from said stationary disc, flexible means connecting said shiftable discs with said stationary disc and forming therebetween a chamber adapted to be placed under vacuum, a brake shoe carried by one of said shiftable discs and movable therewith and disposed on the opposite side of said braking member, and a lever mechanism including a plurality of levers connected to the other of said shiftable discs and to the movable brake shoe and operating upon the movement of said discs when the chamber is placed under vacuum to multiply the effective force acting on said movable brake shoe.

FREDERICK L. SHELOR, Jr.